United States Patent
Ballauf

(10) Patent No.: US 8,966,966 B2
(45) Date of Patent: Mar. 3, 2015

(54) METHOD AND DEVICE FOR IDENTIFYING THE FUEL QUALITY IN A FUEL TANK OF AN INTERNAL COMBUSTION ENGINE

(75) Inventor: Jörg Ballauf, Wettstetten (DE)

(73) Assignee: Audi AG, Ingolstadt (DE)

(*) Notice: Subject to any disclaimer, the term of this patent is extended or adjusted under 35 U.S.C. 154(b) by 504 days.

(21) Appl. No.: 13/360,046

(22) Filed: Jan. 27, 2012

(65) Prior Publication Data

US 2012/0198911 A1  Aug. 9, 2012

(30) Foreign Application Priority Data

Feb. 7, 2011 (DE) .......................... 10 2011 010 508

(51) Int. Cl.
| | |
|---|---|
| F02D 19/00 | (2006.01) |
| F02D 19/08 | (2006.01) |
| F02D 19/06 | (2006.01) |
| F02D 33/00 | (2006.01) |
| F02M 37/00 | (2006.01) |
| F02M 37/10 | (2006.01) |
| F02D 41/14 | (2006.01) |
| F02D 41/24 | (2006.01) |
| F02D 41/00 | (2006.01) |

(52) U.S. Cl.
CPC .......... *F02D 19/087* (2013.01); *F02D 19/0665* (2013.01); *F02D 19/0676* (2013.01); *F02D 33/006* (2013.01); *F02M 37/0082* (2013.01); *F02M 37/10* (2013.01); *F02D 41/1454* (2013.01); *F02D 41/2454* (2013.01); *F02D 41/0025* (2013.01); *Y02T 10/36* (2013.01); *F02D 2200/0612* (2013.01)

USPC .................................................. 73/114.73

(58) Field of Classification Search
None
See application file for complete search history.

(56) References Cited

U.S. PATENT DOCUMENTS

| 7,931,012 | B2 | 4/2011 | Schumacher | |
|---|---|---|---|---|
| 7,987,839 | B2* | 8/2011 | Miersch-Wiemers et al. | 123/679 |
| 2008/0228379 | A1 | 9/2008 | Brox | |
| 2011/0162628 | A1* | 7/2011 | Kurtz et al. | 123/672 |

FOREIGN PATENT DOCUMENTS

| DE | 102007012309 | 9/2008 |
|---|---|---|
| DE | 102007022850 | 11/2008 |
| DE | 102007050122 | 4/2009 |
| DE | 102008007395 | 8/2009 |
| DE | 102009028318 | 2/2011 |

\* cited by examiner

*Primary Examiner* — Robert R Raevis
(74) *Attorney, Agent, or Firm* — Henry M. Feiereisen LLC

(57) ABSTRACT

In a method and a device for identifying the fuel quality in a fuel tank of an internal combustion engine, a reference volume with fuel is provided, which does not intermix with the fuel in the fuel tank when the fuel tank is refilled. After startup of the internal combustion engine, fuel from the fuel tank and from the reference volume is sequentially sucked into the internal combustion engine and parameters which depend from the fuel quality of the sucked-in fuel are measured and evaluated for both the fuel tank and the reference volume. If the parameter differ from one another, it can be concluded that the fuel quality of the fuel in the fuel tank before startup of the internal combustion engine has changed. A quantity (fuel factor) can then be taken into consideration in the mixture pre-control.

17 Claims, 2 Drawing Sheets

METHOD AND DEVICE FOR IDENTIFYING THE FUEL QUALITY IN A FUEL TANK OF AN INTERNAL COMBUSTION ENGINE

CROSS-REFERENCES TO RELATED APPLICATIONS

This application claims the priority of German Patent Application, Serial No. 10 2011 010 508.5, filed Feb. 7, 2011, pursuant to 35 U.S.C. 119(a)-(d), the content of which is incorporated herein by reference in its entirety as if fully set forth herein.

BACKGROUND OF THE INVENTION

The present invention relates to a method and a device for identifying the fuel quality in a fuel tank of an internal combustion engine, in particular of an internal combustion engine of a motor vehicle.

The following discussion of related art is provided to assist the reader in understanding the advantages of the invention, and is not to be construed as an admission that this related art is prior art to this invention.

Methods for identifying the fuel quality in a fuel tank of an internal combustion engine are advantageous in particular with so-called flex-fuel vehicles, which can be operated selectively with gasoline or with ethanol, which have quite different combustion and calorific values. In addition, such methods are also used with motor vehicles having a diesel engine, because these can also be operated with fuels having a different combustion or cetane values. To achieve optimal combustion, the fuel quality must always be considered when controlling the mixture, for example by changing the injected fuel quantity. This process is typically referred to as adaption.

With adaption, it is determined after the startup of the internal combustion engine based, for example, on a deviation of a parameter of the combustion, for example a deviation of the fuel-air ratio measured with a sensor, detected when evaluating a signal from a lambda probe, if the combustion takes place according to specification, or if deviations occur. In the latter case, the motor controller performs an adaptation by controlling the mixture to again provide optimal combustion conditions.

Although deviations from a specification can be determined by evaluating the signal from a lambda probe, these deviations may have different causes, so that a measured deviation can not always be easily correlated with a specific cause, for example a change in the fuel quality. For example, leakage in the region of the injection system or in the air system may cause a similar deviation of the signal of the lambda probe as refilling the fuel tank with a fuel having a lower calorific value.

In addition to evaluating the signal from a lambda probe, other methods exist for determining the quality of the fuel in a fuel tank of an internal combustion engine of a motor vehicle during operation of the motor vehicle. However, most of these methods also cause problems in that a deviation of a measured parameter which is evaluated for identifying the fuel quality may also have other causes, so that a change in the fuel quality cannot be inferred with certainty from the deviation of the parameter.

It would therefore be desirable and advantageous to obviate prior art shortcomings and to provide an improved method and an improved device which enables a reliable determination if a deviation of a measured parameter evaluated for identifying the fuel quality is caused by a change in the fuel quality or is due to other causes.

SUMMARY OF THE INVENTION

According to one aspect of the present invention, a method for identifying a fuel quality in a fuel tank of an internal combustion engine includes the steps of providing a reference volume containing fuel, wherein the fuel in the reference volume is prevented from intermixing with the fuel in the fuel tank when the fuel tank is refilled, sequentially sucking into the internal combustion engine, after startup of the internal combustion engine, fuel from the fuel tank and from the reference volume, measuring and evaluating for the fuel from the fuel tank and the fuel from the reference volume a corresponding parameter which depends on the fuel quality of the corresponding sucked-in fuel, and if a difference between the parameters is detected, concluding that the fuel quality of the fuel in the fuel tank has changed before startup of the internal combustion engine.

According to one aspect of the present invention, a device for identifying a fuel quality in a fuel tank of an internal combustion engine, includes a reference volume containing fuel which is prevented from intermixing with the fuel in the fuel tank when the fuel tank is refilled, a fuel pump for sucking in fuel, wherein the fuel pump can be selectively connected with the fuel tank and with the reference volume, a first device for measuring and evaluating at least one first parameter for the fuel sucked-in from the fuel tank, said at least one parameter dependent on the fuel quality of the fuel sucked in from the fuel tank, a second device for measuring and evaluating separate from the first device at least one parameter for the fuel sucked-in from the reference volume, said at least one second parameter dependent on the fuel quality of the fuel sucked in from the reference volume, and an engine controller comprising a memory for storing a quantity computed from a difference between the at least one first parameter and the at least on second parameter as a fuel factor and controlling a mixture pre-control based on the fuel factor.

The invention is based on the concept to provide a reference volume with fuel which remains initially unchanged when the motor vehicle is refueled. The fuel quality and in particular the calorific or cetane value of the fuel in the fuel tank and of the fuel in the reference volume can then be compared by measuring and evaluating the fuel-quality-dependent parameter, so as to detect any deviations.

The invention is based on the observation that the fuel quality in the fuel tank and in the reference volume differs only when before the internal combustion engine is started up, the fuel tank was refilled with a fuel having a fuel quality that does not correspond to the fuel quality of the fuel that was previously in the fuel tank. However, because a different fuel quality of the fuel sucked in from the fuel tank and of the fuel sucked in from the reference volume can cause a deviation in the measurement and evaluation of the fuel-quality-dependent parameter, it can be very reliably determined with the method of the invention that this deviation is caused by a change in the fuel quality in the fuel tank.

However, if the comparison of the parameter for the fuel from the fuel tank with the parameter from the reference volume does not show a change in the parameter, then this can be due to one of two causes: either the fuel tank was not refilled with fuel before the internal combustion engine was started up, or the fuel tank is refilled with a fuel with the same calorific or cetane value as the fuel that was previously in the fuel tank. Because in both of these situations, the quality of the fuel sucked in before and after the start of the internal combustion engine does not change, a fuel-related adaptation of the mixture control is not required.

According to one advantageous feature of the present invention, after each startup of the internal combustion engine, fuel is first sucked in from the fuel tank and the fuel-quality-dependent parameter is determined for this fuel, before immediately thereafter fuel from the reference volume is sucked and the fuel-quality-dependent parameter is determined for this fuel. The measured and evaluated parameter may then be compared for both fuels, wherein any deviation is unambiguously caused by different fuel qualities and not by other causes, because other causes can be eliminated when fuel from the fuel tank and from the reference volume is sucked in consecutively under the same operating conditions.

According to another advantageous feature of the present invention, the sucked-in fuel is combusted in the internal combustion engine and the fuel-quality-dependent parameter is the oxygen content or the fuel-air ratio in the exhaust gas of the internal combustion engine which is measured by a lambda probe in the exhaust system of the internal combustion engine and evaluated in a motor controller of the internal combustion engine. However, other parameters may also be measured and evaluated, for example the parameter listed in the aforementioned documents.

According to another advantageous feature of the present invention, a detected deviation of the parameter and hence of the fuel quality of the fuel in the fuel tank during operation of the internal combustion engine may be compensated by subsequently including the deviation in the mixture pre-control so as to simplify the mixture control. To this end, a quantity computed from the deviation is stored as a so-called fuel factor, i.e., a value which reflects the determined deviation of the parameter. This fuel factor is then taken into account in the mixture pre-control until the next time the tank is refilled or until the next time a deviation is detected when the parameter is evaluated after the internal combustion engine is started up, by for example adapting the injected fuel quantity as a function of the stored fuel factor.

According to another advantageous feature of the present invention, the reference volume may be completely filled with fuel from the fuel tank no later than when fuel is sucked in from the reference volume. This ensures that at the next startup of the internal combustion engine, the fuel in the reference volume is different from the fuel in the fuel tank only when the fuel tank has in the meantime been refilled with a fuel having a different fuel quality, whereas the fuel in the reference volume is not different from the fuel in the fuel tank if this is not the case.

To obviate the need for a separate container for the reference volume, the reference volume may advantageously be integrated in the fuel tank or in the fuel pump; however, the reference volume is separated from the fuel in the fuel tank such that fuel from the fuel tank can only enter the reference volume after fuel has been sucked in from the reference volume, and not when the fuel tank is being refilled.

To ensure that the composition of the fuel in the reference volume remains initially unchanged when the motor vehicle is refueled, the reference volume may advantageously be housed, for example, inside the fuel tank in a separate chamber which is separated from the rest of the fuel tank by a normally closed valve. This embodiment may advantageously be used when the reference volume is a volume communicating with the gas space or head space of the fuel tank, so that gas from the gas space or head space can flow into the reference volume when the fuel tank is emptied, and the gas which entered the reference volume can be displaced by fuel from the fuel tank by opening the valve after the reference volume is emptied.

According to yet another advantageous feature of the present invention, the chamber may communicate with the fuel tank also by way of an opening disposed below the fluid level of the fuel tank, through which fuel can flow from the fuel tank into the reference volume when fuel is sucked in from the reference volume. The opening is hereby preferably closed by a check valve, which opens only when a vacuum exists in the reference volume. Advantageously, the reference volume has a meandrous or tortuous path so as to prevent the fuel in the reference volume from mixing with the fuel flowing in from the fuel tank, when fuel is sucked in from the reference volume.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
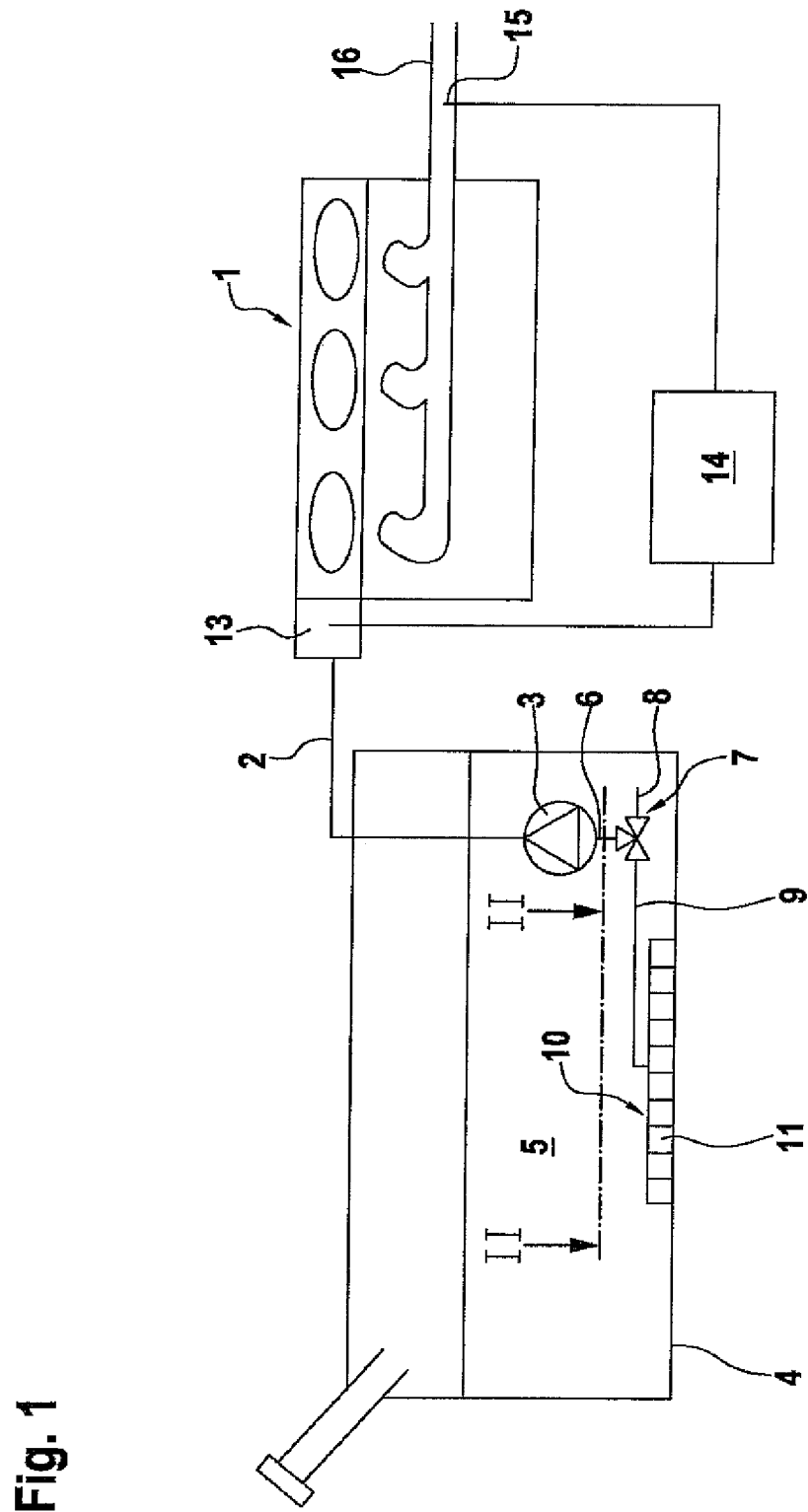
FIG. 1 a schematic cross-sectional view of a portion of a motor vehicle with an internal combustion engine, a fuel tank and an exhaust gas system, and FIG. 2 a schematic cross-sectional view of the fuel tank taken along the line II-II of FIG. 1.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a motor vehicle, which is only partially illustrated in the drawing, with an internal combustion engine 1 which is connected via a fuel supply line 2 with a fuel pump 3 located inside a fuel tank 4, so that the internal combustion engine 1 can be supplied with fuel 5 from the fuel tank 4 during operation.

The fuel pump 3 has an intake opening 6 which can be selectively connected by a switchover valve 7 implemented as a three-way valve via an intake fitting 8 with the interior of the fuel tank 4 or via a fuel line 9 with the interior of a chamber 10 surrounding a reference volume 11, so that when the switchover valve 7 is switched over, fuel 5 can be sucked into the fuel pump 3 either from the interior of the fuel tank 4 or from the interior of the chamber 10 and/or the reference volume 11.

Figure 2:
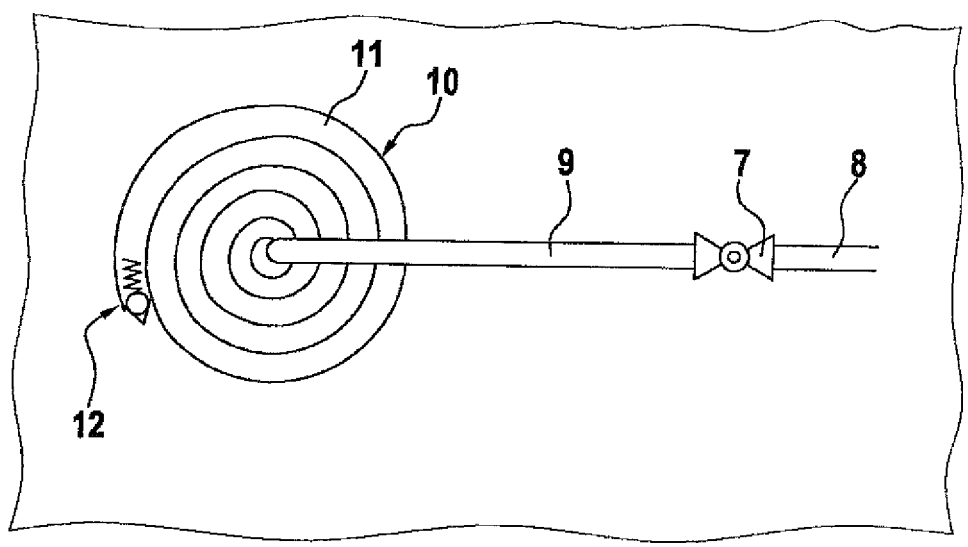

As more clearly shown in FIG. 2, the chamber 10 has the shape of a spiral with an inner end connected via the fuel line 9 with the switchover valve 7 and an outer end communicating with the interior of the fuel tank 4 via a check valve 12. The check valve 12 is constructed so that it is closed when the internal combustion engine 1 is stopped, that the fuel 5 which is hereby supplied to the fuel tank 4 when the fuel tank 4 is refilled, cannot reach the interior of the chamber 10, and that the fuel in the reference volume 11 cannot intermix with the fuel 5 supplied when the fuel tank 4 is refilled. The check valve 12 opens only when the intake opening 6 of the fuel pump 3 is connected with the fuel line 9 via the switchover valve 7 and the fuel pump 3 sucks in fuel from the interior of the chamber 10, resulting in a vacuum in the chamber 10 which causes the check valve 12 to open. Fuel then flows through the open check valve 12 from the fuel tank 4 into the chamber 10; however, due to the tortuous shape of the chamber 10, the fuel does not substantially mix with the fuel that was previously inside the chamber 10. The volume of the chamber 10 and hence also the reference volume 11 is relatively small compared to the volume of the fuel tank 4, and maybe, for example, less than 250 mL.

The fuel sucked in by the fuel pump 3 is transported to an injection system 13 of the internal injection engine 1 which is controlled by an engine controller 14, for example, as a function of the residual oxygen content in the exhaust gas of the internal combustion engine 1 which is measured by a lambda probe 15 in the exhaust system 16 of the internal combustion engine 1 for determining the fuel-air ratio. The residual oxygen content and the fuel-air ratio, respectively, in the exhaust gas of the internal combustion engine 1 depend inter alia on the calorific value of the fuel currently combusted in the combustion chambers of the internal combustion engine 1. Accordingly, the fuel-air ratio can significantly deviate from a desired specified value for a significant change in the fuel quality, unless corresponding countermeasures are taken. Although smaller changes in the fuel quality can be taken care of via the mixture control, larger changes close to the maximum diagnostic threshold may influence or falsify the adaption values from the mixture control.

To prevent such influences or distortions, the switchover valve 7 is initially set at each startup of the internal combustion engine 1 so that fuel is sucked in by the fuel pump 3 through the intake fitting 8 from the interior of the fuel tank 4 and transported to the injection system 13. From the startup of the internal combustion engine 1 on, the signal from the lambda probe 15 is evaluated in the engine controller 14 and the mixture control is activated for adaption so as to adapt the injection time of injection nozzles of the injection system 13 as a function of the residual oxygen content or the fuel-air ratio in the exhaust gas measured by the lambda probe 15 for attaining optimal combustion and hence a desired fuel-air ratio.

Following the adaption, the switchover valve 7 is switched such that fuel is sucked in by the fuel pump 3 from the reference volume 11 through the fuel line 9 and transported to the injection system 13. Although fuel flows from the interior of the fuel tank 4 into the chamber 10 through the check valve 12, the inflowing fuel does not significantly intermix with the fuel previously present in the chamber 10 due to the helical tortuous shape of the chamber 10.

The signal from the lambda probe 15 continues to be evaluated by the engine controller 14 after the valve 7 is switched over. If the signal does not change compared to the previous situation where fuel was sucked in from the interior of the fuel tank 4, then this indicates that the calorific value of the fuel in the reference volume 11 is not different from the calorific value of the fuel 5 in the fuel tank 4, because either the tank was not refilled before startup of the internal combustion engine 1 or because during refueling the fuel filled into the fuel tank 4 has the same calorific value as the fuel that was previously present in the fuel tank 4. Accordingly, any deviations in the fuel-air ratio from the specification or from an expected value detected during the preceding adaption are not caused by a change in the fuel quality, but are due to other causes, for example leaks in the air or fuel system.

However, if the fuel-air ratio measured by the lambda probe 15 changes as soon as fuel is sucked from the chamber 10 compared to the previous situation, where fuel was sucked in from the interior of the fuel tank 4, under otherwise identical operating conditions, for example when idling, then this indicates that the calorific value of the fuel in the reference volume 11 is different from the calorific value of the fuel in the fuel tank 4. This can only be due to the fact that, before the internal combustion engine 1 was started up, the fuel tank 4 was refilled with a fuel having a fuel quality and/or calorific value which are so different from the fuel quality and/or the calorific value of the fuel previously present in the fuel tank 4, so that the fuel mixture now present in the fuel tank 4 has a measurably different fuel quality and/or a measurably different calorific value than the fuel in the reference volume 11.

In order to take such changed fuel quality into account in the operation of the internal combustion engine 1 until the next time the fuel tank 4 is refilled, the deviation of the measured fuel-air ratio and/or a quantity computed therefrom is stored as a fuel factor in a memory of the engine controller 14 and taken into consideration in the mixture pre-control until the next time a change in the fuel quality is detected during a later refueling of the motor vehicle.

Thereafter, fuel is sucked in from the chamber 10 by the fuel pump 3 until it is ensured that the entire fuel in the reference volume 11 has been replaced by fuel from the interior of the fuel tank 4 which flows into the chamber 10 through the check valve 12 while fuel is sucked in from the chamber 10. The switchover valve 7 is then again switched, so that the fuel 5 is sucked in from the fuel tank 4. From this time on, the fuel in the reference volume remains unchanged until the next startup of the internal combustion engine 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for identifying a fuel quality in a fuel tank of an internal combustion engine, comprising the steps of:
   providing a reference volume containing fuel, wherein the fuel in the reference volume is prevented from intermixing with the fuel in the fuel tank when the fuel tank is being refilled,
   sequentially sucking into the internal combustion engine, after startup of the internal combustion engine, fuel from the fuel tank and from the reference volume,
   measuring and separately evaluating for the fuel from the fuel tank and the fuel from the reference volume a corresponding parameter which depends on the fuel quality of the corresponding sucked-in fuel, and
   when under identical operating conditions of the operating internal combustion engine a difference between the corresponding parameter for the fuel from the fuel tank and the fuel from the reference volume is detected, concluding that the fuel quality of the fuel in the fuel tank differs from the fuel quality of the fuel contained in the reference volume.

2. The method of claim 1, wherein the internal combustion engine is an internal combustion engine of a motor vehicle.

3. The method of claim 1, wherein after each startup of the internal combustion engine, fuel from the fuel tank is sucked in first and the fuel quality of the fuel from the fuel tank is determined, whereafter fuel from the reference volume is sucked in and the fuel quality of the fuel sucked in from the reference volume is determined.

4. The method of claim 1, wherein the reference volume is filled with fuel from the fuel tank while or after fuel is sucked in from the reference volume.

5. The method of claim 4, wherein the fuel supplied from the fuel tank into the reference volume is prevented from intermixing with the fuel in the reference volume.

6. The method of claim 1, wherein a change in the fuel quality of the fuel in the fuel tank is compensated by a mixture pre-control.

7. The method of claim 6, further comprising the steps of:
   computing from the difference between the parameters a quantity,
   storing the quantity as a fuel factor, and
   taking the fuel factor into account in the mixture pre-control.

8. The method of claim 1, wherein the parameter is determined during combustion of the fuel in the internal combustion engine.

9. The method of claim 8, wherein the parameter is a residual oxygen content or a fuel-air ratio in exhaust gas of the internal combustion engine.

10. A device for identifying a fuel quality in a fuel tank of an internal combustion engine, comprising:
    a reference volume containing fuel which is prevented from intermixing with the fuel in the fuel tank when the fuel tank is refilled,
    a fuel pump for sucking in fuel, wherein the fuel pump can be selectively connected with the fuel tank and with the reference volume,
    a device for measuring and evaluating at least one parameter separately for the fuel sucked-in from the fuel tank and for the fuel sucked-in from the reference volume, said at least one parameter dependent on the fuel quality of the fuel sucked in from the fuel tank and from the reference volume, respectively,
    and
    an engine controller comprising a memory for storing as a fuel factor a quantity computed from different values of the at least one parameter for the fuel quality of the fuel sucked in from the fuel tank and from the reference volume, respectively, and controlling a mixture pre-control based on the fuel factor.

11. The device of claim 10, wherein the internal combustion engine is an internal combustion engine of a motor vehicle.

12. The device of claim 10, further comprising a switchover valve for selectively connecting the fuel pump with the fuel tank or with the reference volume.

13. The device of claim 10, wherein the reference volume is in housed inside the fuel tank.

14. The device of claim 10, wherein the reference volume communicates with the fuel tank by way of an inlet opening disposed in the fuel tank and arranged below a fuel level, wherein a check valve or a one-way valve is disposed in the inlet opening.

15. The device of claim 14, wherein the reference volume has a tortuous or meandrous shape between the inlet opening and an outlet opening configured for sucking fuel out of the reference volume.

16. The device of claim 10, wherein the fuel pump is selectively connectable the reference volume or to the fuel tank by a three-way valve.

17. The device of claim 16, wherein the reference volume communicates with a gas space or a head space of the fuel tank.

\* \* \* \* \*